United States Patent
Tokunaga et al.

[11] Patent Number: 5,591,478
[45] Date of Patent: Jan. 7, 1997

[54] DESICCANT, METHOD FOR PRODUCING THE SAME AND METHOD FOR USING THE SAME

[75] Inventors: Takahisa Tokunaga; Junko Kajihara; Masao Hirayama; Hidemasa Hidaka, all of Saitama; Hayami Itoh, Hyogo; Masao Hayashitani, Hyogo; Yoshihiro Kajibata, Hyogo; Tatsuya Imura, Hyogo, all of Japan

[73] Assignees: Meiji Seika Kaisha, Ltd., Tokyo; Kawasaki Jukogyo Kabushiki Kaisha, Hyogo, both of Japan

[21] Appl. No.: 487,585

[22] Filed: Jun. 7, 1995

Related U.S. Application Data

[63] Continuation of Ser. No. 26,289, Mar. 4, 1993, abandoned.

[30] Foreign Application Priority Data

Jul. 15, 1992 [JP] Japan .................................. 4-209523

[51] Int. Cl.$^6$ ...................................................... A23G 3/00
[52] U.S. Cl. ............................................ 426/658; 426/804
[58] Field of Search ................................... 536/124, 102; 426/658, 3, 548, 804

[56] References Cited

U.S. PATENT DOCUMENTS

| | | | |
|---|---|---|---|
| 4,870,059 | 9/1989 | Mitsuhashi et al. | 426/658 |
| 4,975,535 | 12/1990 | Masal et al. | 536/124 |
| 5,166,193 | 11/1992 | Levin et al. | |

Primary Examiner—Frank Spear
Attorney, Agent, or Firm—Sughrue, Mion, Zinn, Macpeak & Seas

[57] ABSTRACT

A desiccant comprising crystalline, anhydrated nystose, which contains 70% or more of nystose and 2% or less of moisture and is in the form of a crystalline powder, is capable of maintaining water activity of a food at an extremely low level without heat drying the food or drying the food with silica gel or the like and can safely prevent deteriorations of foods and maintain the qualities at a low cost. The desiccant can be produced by anhydrating crystalline nystose hydrate under reduced pressure or in the presence of a dehydrating agent. The desiccant is used for lowering water activity of a food and maintaining the same, by directly contacting the desiccant with the food or mixing the same with the food.

1 Claim, 4 Drawing Sheets

DESICCANT, METHOD FOR PRODUCING THE SAME AND METHOD FOR USING THE SAME

This is a continuation of application Ser. No. 08/026,289 filed Mar. 4, 1993 (abandoned).

FIELD OF THE INVENTION

This invention relates to a desiccant comprising crystalline, anhydrated nystose, a method for producing the same and a method for applying the same to foods. The desiccant of the present invention, which comprises crystalline, anhydrated nystose, is an edible one and has strong moisture absorption characteristics. Thus it is useful as a desiccant which can be directly contacted with or added to a food to thereby control the moisture content thereof.

BACKGROUND OF THE INVENTION

In general, the moisture in a food is an important factor affecting its physicochemical properties, storage life, texture and flavor. For example, physical deteriorations in shape and hardness due to the evaporation or absorption of water, microbial deteriorations due to fungi and bacteria and chemical deteriorations such as color change, fading out and oxidation of fats are serious problems in the preservation of foods. In order to cope with these problems, it is essential to control the moisture content and water activity of foods.

Namely, a food contained in a closed space has a certain vapor pressure. The ratio of this vapor pressure to the saturated vapor pressure is referred to as the water activity. In order to prevent the above-mentioned deteriorations, there have been known methods for effectively storing foods by using desiccants to thereby lower the water activity or maintain it at a constant level. A number of desiccants have been applied to foods. These desiccants are generally used by introducing into a closed container separately from a food. On the other hand, it has been required to develop edible desiccants which can be directly contacted with or added to foods and there have been proposed some materials for producing such desiccants. For example, silica gel can be directly added to foods, though the acceptable content and taste thereof restrict its addition.

On the other hand, anhydrous maltose described in JP-A-62-125854 and anhydrous raffinose described in JP-A-62-152537 are usable as edible desiccants (the term "JP-A" as used herein means an "unexamined published Japanese patent application"). However these substances are still unsatisfactory in properties relating to water activity. It is, therefore, urgently required to develop an edible desiccant of improved characteristics. Furthermore, anhydrous raffinose becomes deliquescent when absorbing water, which makes its food processing properties poor.

Regarding nystose, there have been reported crystalline nystose trihydrate obtained by recrystallizing from water/methanol [m.p.: 129°–131° C.; H., Tsuchida et al., Agric. Biol. Chem., 30, 429–433 (1966)], crystalline nystose monohydrate obtained by recrystallizing from ethanol/methanol [m.p.: <134° C.; J. P. Kamerling et al., Carbohydr. Res., 25, 293–297 (1972)] and amorphous nystose anhydride obtained by heating the crystalline nystose trihydrate at a high temperature under reduced pressure [no m.p. is given; H. Tsuchida et al., Agric. Biol. Chem., 30, 429–433 (1966)]. However it is reported that none except the amorphous nystose anhydride shows water absorption characteristics.

SUMMARY OF THE INVENTION

An object of the present invention is to provide a desiccant which is edible and has excellent moisture absorption characteristics.

The present inventors have conducted extensive studies in order to solve the problems observed in conventional desiccants and drying methods. As a result, they have successfully found that crystalline, anhydrated nystose has excellent moisture absorption characteristics as a desiccant. More specifically, it has been found that a desiccant comprising crystalline, anhydrated nystose obtained by dehydrating a crystalline nystose hydrate can maintain the water activity at an extremely low level while keeping its crystallinity without causing any phase transition and that it is therefore usable as a desiccant capable of controlling the moisture content of foods.

The present invention relates to a desiccant comprising crystalline, anhydrated nystose which contains 70% or more of nystose and 2% or less of moisture and being a crystalline powder, a method for producing a desiccant comprising said crystalline, anhydrated nystose which comprises anhydrating a crystalline nystose hydrate under reduced pressure, a method for producing a desiccant comprising said crystalline, anhydrated nystose which comprises anhydrating a crystalline nystose hydrate in the presence of a dehydrating agent and a method for lowering and maintaining the water activity of a food which comprises directly contacting a desiccant comprising said crystalline, anhydrated nystose with the food or mixing the same with the food.

DETAILED DESCRIPTION OF THE INVENTION

Figure 1:
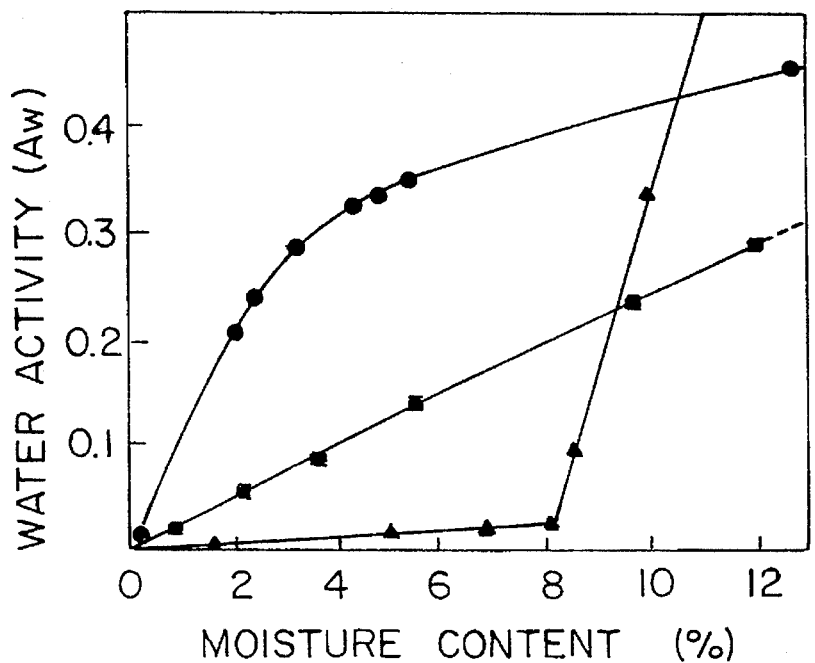
FIG. 1 is a graph showing the relation between the absorbed moisture content and water activity of desiccants comprising crystalline, anhydrated nystose (sometimes hereinafter referred to as anhydrated nystose) (-△-), anhydrous raffinose (-■-) or anhydrous maltose (-●-).

The desiccant of the present invention comprises crystalline, anhydrated nystose which is a crystalline powder containing 70% or more of nystose and 2% or less of moisture. It has a powerful ability to absorb moisture while keeping its crystallinity and, furthermore, maintaining the water activity at an extremely low level, thus showing excellent moisture absorption characteristics. This crystalline powder may be solidified and used in the form of, for example, tablets if needed.

The desiccant comprising crystalline, anhydrated nystose can be produced by anhydrating a crystalline nystose hydrate to be used as a starting material under reduced pressure or in the presence of a dehydrating agent. Any crystalline nystose hydrate may be used as the starting crystalline nystose hydrate so long as it contains at least 70% of nystose. A preferable example thereof is a crystalline nystose hydrate of a nystose purity of about 84% or above, which is crystals in the form of columns, shows polarization when observed by polarizing microscope and has melting point of 118° to 126° C. Such a crystalline nystose hydrate can be obtained by (i) fractionating a fructooligosaccharide mixture by liquid chromatography to obtain a fraction rich in nystose and crystallizing nystose out of the fraction by cooling, (ii) fractionating a fructooligosaccharide mixture, which is obtained by enzymatically treating sucrose, by liquid chromatography to obtain a nystose-rich fraction, concentrating the fraction and crystallyzing nystose out of the concentrate by cooling, or (iii) subjecting nystose hydrate obtained in the above (i) or (ii) to recrystallization repeatedly from water.

The anhydration under reduced pressure can be performed under a pressure of 100 mmHg or below within a temperature range of from room temperature to 110° C. for 4 to 96 hours. It is preferable to perform this treatment under a pressure of 10 mmHg or below at a temperature of from 60° to 90° C. for 4 to 72 hours. The anhydration in the presence of a dehydrating agent can be performed by introducing the starting material into a closed container together with a marketed inorganic dehydrating agent. As a preferable example of the dehydrating agent, phosphorus pentaoxide may be cited in an amount of 0.5 part by weight per part by weight of the starting material. The dehydration reaction can be carried out at room temperature for about 240 hours.

The desiccant comprising crystalline, anhydrated nystose is obtained as a white powder containing 2% or less of moisture. The crystals of the anhydrated nystose is in the form of columns and show polarization when observed by polarizing microscope. It is highly advantageous in being usable as an edible desiccant, since nystose per se is a sweetener harmless to man.

As the moisture absorption characteristics of this substance, the excellent ability to maintain water activity and the powerful ability to absorb water may be cited. It exerts immediate water absorption effects over a wide range of relative humidity, which makes it highly useful as a desiccant.

A method for using the desiccant of the present invention comprising crystalline, anhydrated nystose is described in detail below.

It is a serious problem in the storage of foods to suppress deteriorations in functions, texture and form due to the evaporation or absorption of water. For example, moisture content, in particular, water activity closely relate to the survival ratio of bacteria contained in tablet candies having viable bacteria, the texture (including hardness) of tablet candies, biscuits and *Senbei* (rice-cake), and fading out of edible pigments contained in foods. It is known that these deteriorations can be suppressed by lowering the water activity and maintaining the same at a low level.

That is to say, the commercial value of tablet candies containing bifidus bacteria depends on the survival ratio of the bifidus bacteria contained in the product. It is considered that the optimum water activity (Aw) of bifidus bacteria is about 0.1 [Toshio Tatematsu et al., Toketsu oyobi Kanso Kenkyukai-shi (Journal of Society of Freezing and Drying), 28, 40–45 (1982)]. It is, therefore highly important how to maintain the water activity at the optimum level. In the prior art, it is considered necessary to strictly dry starting materials in order to elevate the survival ratio of bifidus bacteria contained in tablet candies having bifidus bacteria.

In contrast, the present invention makes it possible to achieve a lower water activity and to remarkably elevate the survival ratio of bifidus bacteria by adding an edible desiccant to the materials for producing such tablet candies. As described in Example 4 below, the water activity of a tablet candy containing a desiccant of the present invention comprising crystalline, anhydrated nystose was lowered to 0.20, while the control one showed a water activity of 0.28. After 10 weeks, the survival ratio of bifidus bacteria in the product of the invention was thrice as high as that of the control. Accordingly, the desiccant of the present invention can remarkably improve the commercial value of a product and is highly applicable to foods.

Furthermore, the texture (hardness), the form and the fading out of foods are deteriorated due to water absorption. It is therefore needed to maintain the initial qualities of the foods. When the decrease in the water activity of a food is suppressed by adding the desiccant of the present invention comprising crystalline, anhydrated nystose, the hardness of tablet candies can be maintained and the fading out of pigments contained in foods can be effectively prevented. Thus the desiccant of the present invention is widely usable.

The desiccant of the present invention, which is an edible one having powerful moisture absorption characteristics, can be directly contacted or mixed with foods under dry conditions. Accordingly, it is widely applicable to, for example, confectioneries such as tablet candies, chocolates and biscuits, powedered foods such as powdered juice, soup and seasonings, powdered milk products such as powdered cream for coffee and processed powdered milk and freeze-dried foods such as freeze-dried vegetables, fish paste and the like. The desiccant of the present invention can absorb up to 8% of moisture based on the weight thereof. The amount of the dessicant of the present invention to be added to foods can be adjusted depending on moisture content of the foods. The desiccant of the present invention may be used with other additives which do not inactivate moisture absorbent ability of the dessicant. Examples of the additives include dry starch, powdered sugar and the like.

According to the present invention, the water activity of a food can be maintained at an extremely low level without heat drying the food or drying the food using silica gel or the like. Accordingly, the present invention makes it possible to safely prevent deteriorations of foods and maintain the qualities at a low cost.

To further illustrate the present invention, the following Examples are given, but are not to be construed to limit the scope of the present invention.

EXAMPLE 1

A crystalline nystose hydrate was prepared by fractionating a fructooligosaccharide mixture by liquid chromatography to obtain a nystose-rich fraction and recrystallizing nystose out of the fraction. 100 g of the thus obtained nystose hydrate (m.p.: 120°–124° C., nystose content: 83%, moisture content: 6.2%) was dried under reduced pressure of 1 mmHg at a temperature of 80° C. for 24 hours. Thus a desiccant comprising crystalline, anhydrated nystose (yield: 95%, m.p.: 120°–124° C., nystose content: 84%, moisture content: 1.4%) was obtained to serve as Sample No. 1. In addition, desiccants were prepared by treating crystalline nystose hydrates of various purities under various drying conditions as specified in Table 1.

Each starting crystalline nystose hydrate was prepared as follows.

A 66% aqueous solution of commercially available MEIOLIGO-P (Meiji Seika Kaisha, Ltd.) was crystallized at 25° C. for 120 hours. The thus obtained crystalline nystose hydrate was used as a starting material for preparing Sample No. 2. The resulting nystose hydrate was recrystallized under the same conditions as mentioned above. The thus obtained crystalline nystose hydrate was used as a starting material for preparing Sample Nos. 3, 4 and 6. This nystose hydrate was further recrystallized under the same conditions as mentioned above to obtain the starting crystalline nystose hydrate for preparing Sample No. 5.

Table 1 shows the results.

cake, while the anhydrated nystose of the present invention remained dry and flowable.

Based on these results, it has been proved that the desiccant comprising crystalline, anhydrated nystose is highly advantageous as a desiccant for foods.

EXAMPLE 3

Changes in moisture absorption ratio of a desiccant comprising crystalline, anhydrated nystose Sample No. 5 obtained in Example 1 or anhydrous maltose were examined by preserving each sample in a closed container at 25° C. and at the relative humidity of 31%, 51% and 81%. Moisture absorption ratio was calculated as increased weight (%).

Figure 2:
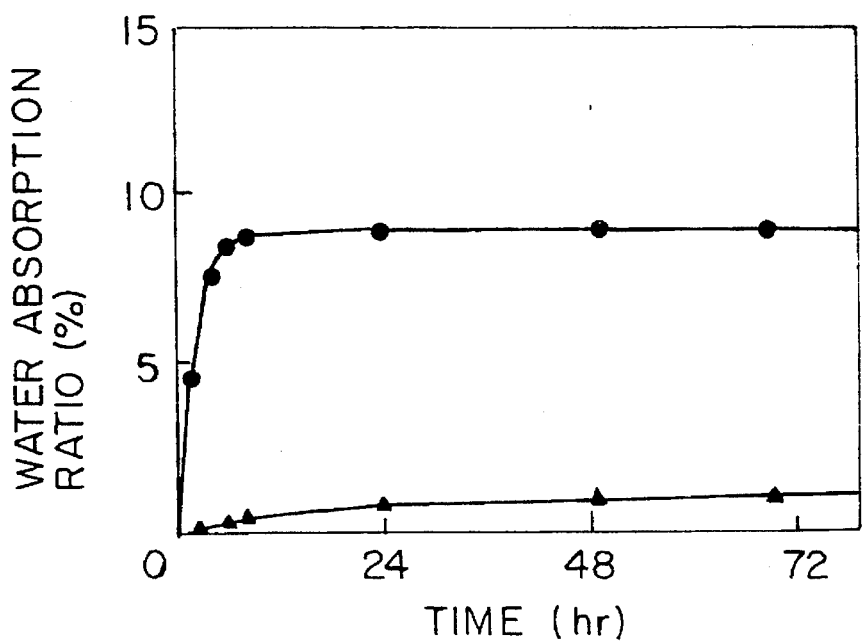
FIG. 2 is a graph showing the water absorption curves of desiccants comprising crystalline, anhydrated nystose (-●-) or anhydrous maltose (-△-) at a relative humidity of 31%.
Figure 3:
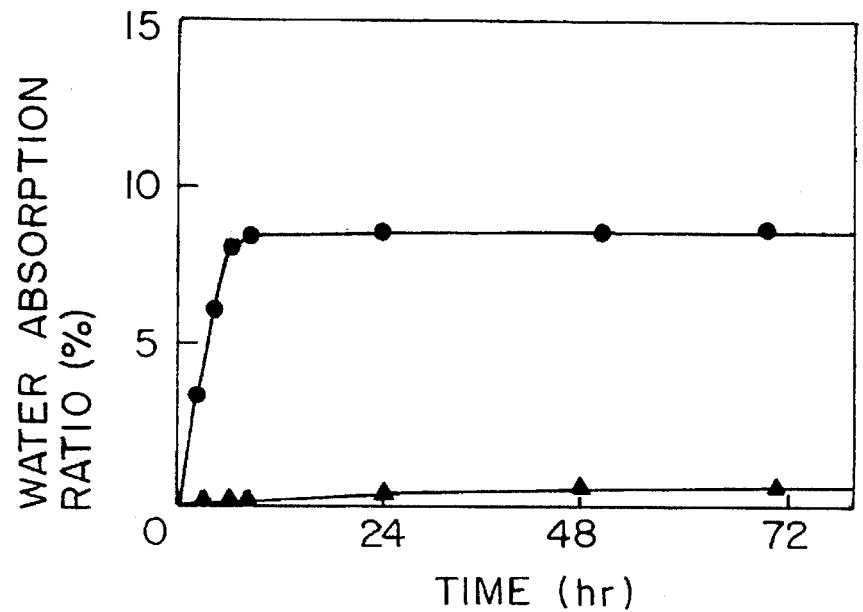
FIG. 3 is a graph showing the water absorption curves of desiccants comprising crystalline, anhydrated nystose (-●-) or anhydrous maltose (-△-) at a relative humidity of 51%.
Figure 4:
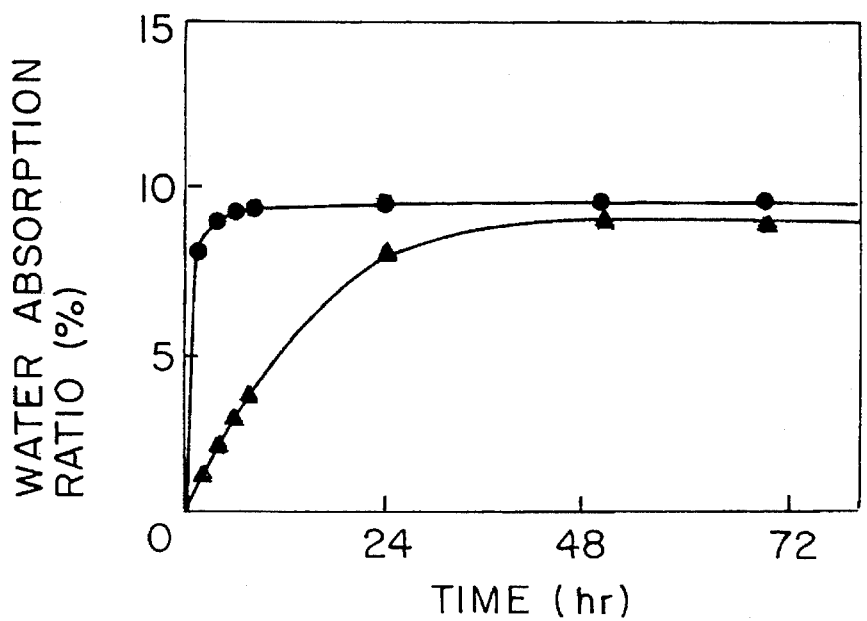
FIG. 4 is a graph showing the water absorption curves of desiccants comprising crystalline, anhydrated nystose (-●-) or anhydrous maltose (-△-) at a relative humidity of 81%.

FIGS. 2, 3 and 4 show the results.

As these results clearly show, the desiccant comprising crystalline, anhydrated nystose attained a water absorption ratio of about 8% within 10 hours at each relative humidity. In contrast, the water absorption ratio of the anhydrous maltose remained around 1% after 72 hours at relative humidity of 31 and 51%.

These results indicate that the crystalline, anhydrated nystose exhibits an immediate and excellent water absorbing effect over a wide range of relative humidity and, therefore, is highly useful as a desiccant.

TABLE 1

Production of desiccants comprising crystalline, anhydrated nystose from crystalline nystose hydrates

| | Crystalline nystose hydrate | | | Drying conditions | | | | Desiccant comprising crystalline, anhydrated nystose | | |
| --- | --- | --- | --- | --- | --- | --- | --- | --- | --- | --- |
| Sample No. | Nystose content (%) | Moisture content (%) | m.p. (°C.) | Temperature (°C.) | Pressure (mmhg) | Time (hr.) | Yield (%) | Nystose content (%) | Moisture content (%) | m.p. (°C.) |
| 1 | 83 | 6.2 | 120–124 | 80 | 1 | 24 | 95 | 84 | 1.4 | 120–124 |
| 2 | 72 | 5.4 | 118–121 | 60 | 1 | 48 | 94 | 73 | 1.2 | 118–121 |
| 3 | 95 | 7.0 | 123–126 | 80 | 1 | 24 | 94 | 95 | 1.5 | 123–126 |
| 4 | 95 | 7.0 | 123–126 | 70 | 2 | 70 | 93 | 95 | 0.6 | 123–126 |
| 5 | 99 | 7.0 | 127 | 80 | 1 | 24 | 94 | 99 | 1.6 | 127 |
| 6* | 95 | 7.0 | 123–126 | room temperature | atmospheric | 240 | 94 | 95 | 1.6 | 124–126 |

*Note: Sample No. 6 was obtained by treating the starting nystose hydrate with 0.5 part by weight of $P_2O_5$ as a dehydrating agent per part by weight of the starting material.

EXAMPLE 2

4.0 g of the desiccant comprising crystalline, anhydrated nystose, Sample No. 5 obtained in Example 1 was precisely weighed. To a filter paper was added 2, 4, 6, 8, 10 and 12% of water based on the weight of the anhydrated nystose. Then the precisely weighed anhydrated nystose and the filter paper were introduced into a single container and allowed to come to equilibrium overnight. Then the anhydrated nystose was weighed and the water activity thereof was measured with Rotronic-Hygroskop DT (Gunze Sangyo, Inc.). On the other hand, anhydrous raffinose and anhydrous maltose were treated in the same manner as a control.

FIG. 1 shows the results.

As the results given in FIG. 1 clearly show, the desiccant comprising crystalline, anhydrated nystose showed no increase in water activity until the moisture content reached 8%. On the other hand, the water activity of the anhydrous raffinose was increased with an increase in the moisture content and the water activity of the anhydrous maltose showed a more remarkable increase. After absorbing water, the anhydrous raffinose was solidified and converted into a

EXAMPLE 4

Powder for bifidus bacteruim-containing tablet candies was mixed with a desiccant comprising crystalline, anhydrated nystose, anhydrous raffinose or sucrose (as a control) to give the composition specified in Table 2. 3 g portions of these powders were sealed in aluminum bags and stored at 25° C. under a relative humidity of 65% for 10 weeks and changes in the number of bifidus bacteria were monitored during this storage period. The number of bifidus bacteria were examined by the following method. Namely, 1 g of a sample was dissolved in 10 ml of a M/6 phosphate buffer solution (pH 7.0) and serial 10-fold dilution of the solution thus obtained was performed with a 0.1% solution of yeast extract. This diluted solution was applied onto a Petri dish and 20 ml of a BL agar medium was added thereto. After mixing and solidifying, the resulting culture medium was incubated in an anaerobic jar for 72° hours and the number of colonies was counted.

Figure 5:
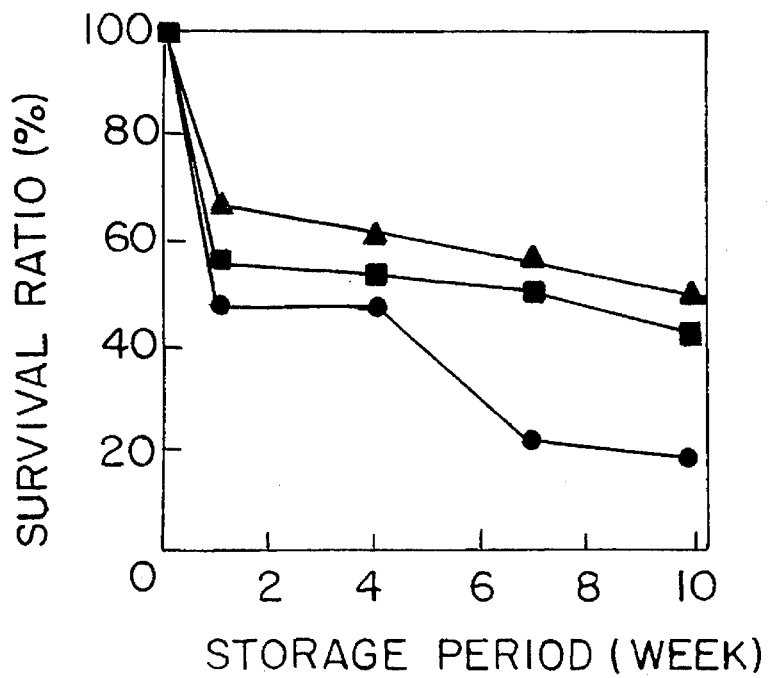
FIG. 5 is a graph showing the water activity and the survival ratio of bifidus bacteria in a powder for tablet candy containing bifidus bacteria blended with desiccants comprising crystalline, anhydrated nystose having water activity of 0.20 (-△-), anhydrous raffinose having water activity of 0.23 (-■-) or a control (sucrose) having water activity of 0.28 (-●-) at 25° C. and at a relative humidity of 65%.

FIG. 5 shows the results.

As these results clearly show, the desiccant comprising crystalline, anhydrated nystose maintained the most excellent water activity (Aw=0.20) and gave a high survival ratio of the bifidus bacteria, compared with the control one, even under such relatively severe storage conditions.

TABLE 2

Composition of powders for bifidus bacterium containing tablet candies (% by weight)

| Component | Control | Anhydrous raffinose | Anhydrous nystose |
|---|---|---|---|
| Granular sugar | 82.590 | 82.590 | 82.590 |
| Sour flavor | 5.853 | 5.853 | 5.853 |
| Fermented milk powder | 5.307 | 5.307 | 5.307 |
| Bifidus bacterium powder | 0.100 | 0.100 | 0.100 |
| Sugar ester | 0.900 | 0.900 | 0.900 |
| Flavor | 0.250 | 0.250 | 0.250 |
| Sucrose (granular sugar) | 5.000 | — | — |
| Anhydrous raffinose | — | 5.000 | — |
| Anhydrous nystose | — | — | 5.000 |
| Total | 100.000 | 100.000 | 100.000 |

EXAMPLE 5

Powders for bifidus bacterium-containing tablet candies of the same compositions as those prepared in the above Example 4 were molded and changes in hardness due to water absorption were monitored by using a hardness meter (manufactured by Mokuya Seisakusho K.K.).

Figure 6:
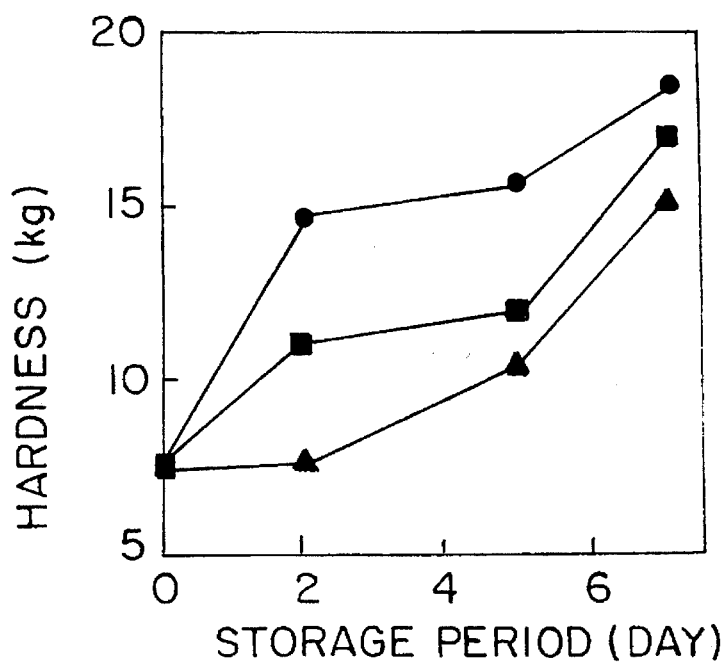
FIG. 6 is a graph showing changes in the texture (hardness) of a tablet candy obtained by blending a powder for tablet candy containing bifidus bacteria with desiccants comprising crystalline, anhydrated nystose (-△-), anhydrous raffinose (-■-) or a control (sucrose) (-●-) followed by molding, which was stored at 25° C. and at a relative humidity of 81%.

FIG. 6 shows the results.

As these results clearly show, an increase in hardness accompanying water absorption was observed in the case of the anhydrous raffinose or the control and the sample underwent partial deliquescence. In contrast, the hardness of the one containing the desiccant comprising the crystalline, anhydrated nystose was maintained at the initial level for a long time even under such relatively severe storage conditions.

EXAMPLE 6

Red-colored white chocolate mass was mixed with a desiccant comprising crystalline, anhydrated nystose (initial water activity: 0.29) to give the composition specified in Table 3. The same chocolate mass containing no desiccant (initial water activity: 0.34) was used as a control. 2 g portions of these doughs were solidified in cells for a color difference meter for one day and then introduced in marketed sacks for chocolate. After storing at a temperature of 27° C. under a relative humidity of 80% for 48 days, the effects of suppressing fading of the red pigment due to water absorption were determined with a color difference meter (manufactured by Tokyo Denshoku K.K.). Red color density was expressed in accordance with Hunter color expression.

Figure 7:
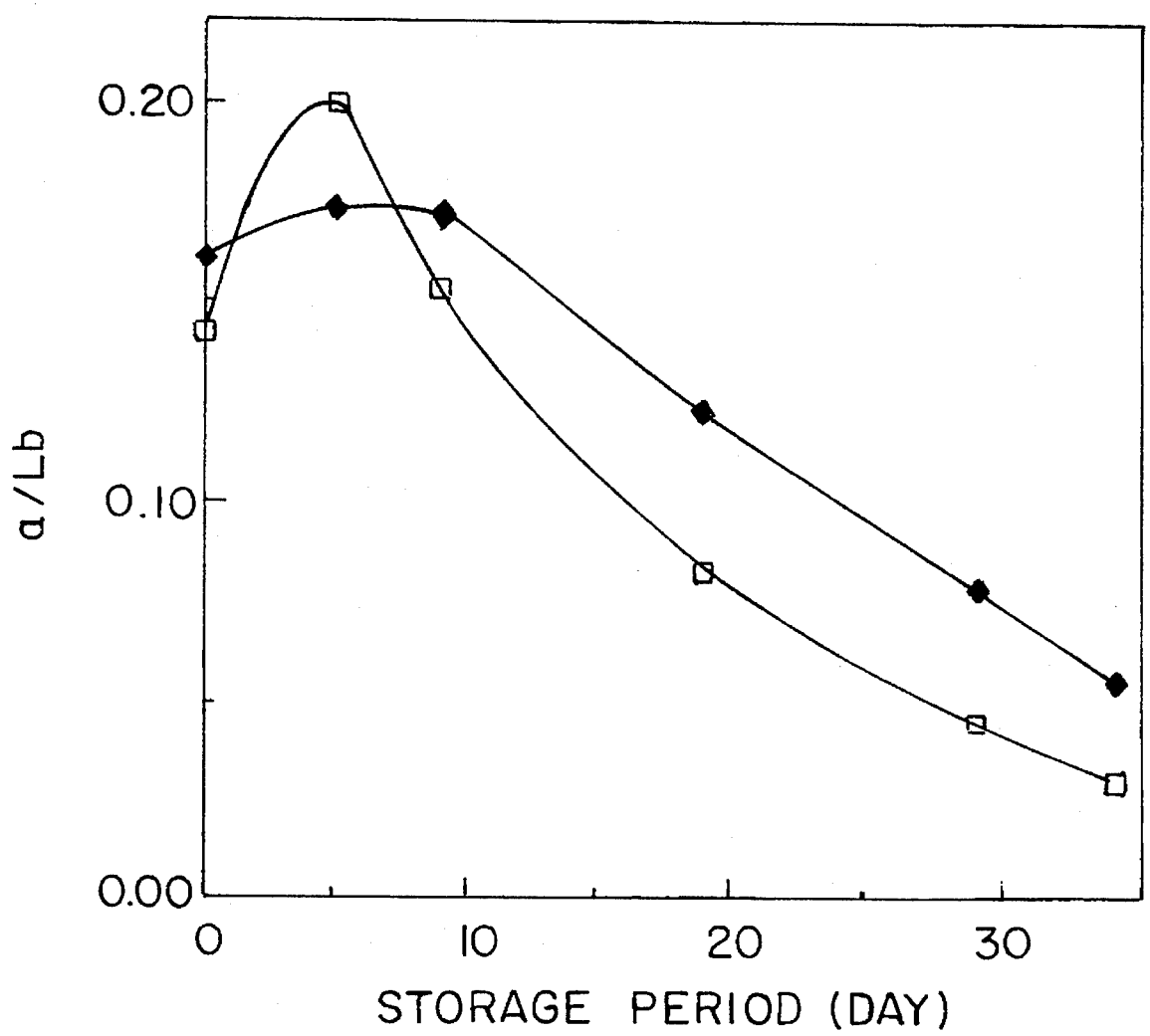
FIG. 7 is a graph showing the pigment-fading suppression effects of desiccants comprising crystalline, anhydrated nystose (-♦-) or a control (-□-) on a colored white chocolate dough.

FIG. 7 shows the results.

As these results clearly show, the addition of the desiccant comprising the crystalline, anhydrated nystose suppressed the fading of the red pigment.

TABLE 3

Composition of red-colored white chocolate dough (% by weight)

| Component | Control | Anhydrous nystose |
|---|---|---|
| Sugar | 35 | 35 |
| Lactose | 20 | 20 |
| Defatted milk | 10 | 10 |
| Fat | 33.4 | 33.4 |
| Flavor | 0.1 | 0.1 |
| Beet red pigment | 0.5 | 0.5 |
| Emulsifier | 0.5 | 0.5 |
| Fruit juice powder | 0.5 | 0.5 |
| Anhydrated nystose | — | 6 |

While the invention has been described in detail and with reference to specific examples thereof, it will be apparent to one skilled in the art that various changes and modifications can be made therein without departing from the spirit and scope thereof.

What is claimed is:

1. A method for lowering the water activity of a food and maintaining the same, which comprises directly contacting a desiccant comprising crystalline, anhydrated nystose which contains 70% or more of nystose and 2% or less of moisture and is in the form of a crystalline powder, with the food or mixing the same with the food.

* * * * *